United States Patent

[11] 3,601,695

| | | |
|---|---|---|
| [72] | Inventor | William A. Heile<br>Indianapolis, Ind. |
| [21] | Appl. No. | 875,704 |
| [22] | Filed | Nov. 12, 1969 |
| [45] | Patented | Aug. 24, 1971 |
| [73] | Assignee | The United States of America as represented by the Secretary of the Navy |

[54] SINGLE CAVITY FREQUENCY AND BANDWIDTH STABILIZED ABSOLUTE MICROWAVE REFRACTOMETER
6 Claims, 2 Drawing Figs.

[52] U.S. Cl. .................................................. 324/58.5 C
[51] Int. Cl. ...................................................... G01n 27/04
[50] Field of Search ............................................ 324/58, 58.5

[56] References Cited
UNITED STATES PATENTS
3,356,941  12/1967  Everman ........................ 324/58.5 C Primary Examiner—Edward E. Kubasiewicz
Attorneys—R. S. Sciascia and H. H. Losche ABSTRACT: An airborne absolute microwave refractometer having an externally mounted sampling cavity fed a range of sweep frequencies from a sweep oscillator to produce a resonance response signal the phase of which is determined by the refractive index of the air within the cavity which resonance signal is converted in a direct (DC) voltage proportional to the refractive index of the air within the sampling cavity, the sweep frequencies also being mixed with the frequency of a crystal controlled reference oscillator and the resultant difference frequency fed through two band-pass filters and two channels of response amplifiers to automatic frequency control and automatic bandwidth control circuits, the outputs of which are fed back to the sweep oscillator to maintain the proper center frequency and bandwidth of the generated sweep frequency regardless of temperature and altitude variations.

INVENTOR.
WILLIAM A. HEILE

SINGLE CAVITY FREQUENCY AND BANDWIDTH STABILIZED ABSOLUTE MICROWAVE REFRACTOMETER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to refractometers and more particularly to airborne types of microwave refractometers to obtain an instantaneous and continuous index of refraction of the atmosphere through which the aircraft bearing the refractometer is flying to evaluate the microwave energy scattering occasioned by these changes. Changes in the index of refraction of the atmosphere can be compensated in such equipment as radio and radar transmitters and receivers, and the like.

In the 1950s the method of measuring refractive index profiles of the atmosphere employed complex vacuum tube devices requiring highly skilled operators but these devices were not suitable for general usage. In the early 1960s refractometer devices were developed with solid state elements therein. One such solid-state refractometer was developed and disclosed in U.S. Pat. No. 3,356,941 which exceeded the capabilities of the tube devices but had the disadvantage of requiring a long warm-up period prior to use and also required good temperature control to obtain satisfactory results.

SUMMARY OF THE INVENTION

In the present invention solid state electrical elements are used and no warmup time is needed to place the refractometer into operation. In this invention the oscillations of a temperature compensated crystal controlled oscillator and a sweep oscillator are mixed and the difference frequency filtered into two intermediate frequency (IF) channels. One channel provides an automatic frequency control (AFC) for the sweep oscillator while the other channel provides automatic bandwidth control (ABC) for the sweep oscillator thereby eliminating the necessity for oven controlled circuit temperature. This precisely controlled sweep frequency is applied to a transmission type sampling cavity exposed to the atmosphere. When a resonant frequency is encountered, an electrical signal is developed and converted to a DC signal representative of the refractive index of the atmosphere. It is accordingly, a general object of this invention to provide an airborne microwave refractometer that becomes operative in a few seconds after being switched "on" to develop DC voltage representative of an accurate indication of the index of refraction of the atmosphere which requires familiarization but not skilled training to operate.

BRIEF DESCRIPTION OF THE DRAWINGS

These and other objects and the attendant advantages, features, and uses will become more apparent as a more detailed description proceeds when considered along with the accompanying drawing in which.

DESCRIPTION OF THE PREFERRED EMBODIMENT

Figure 1:
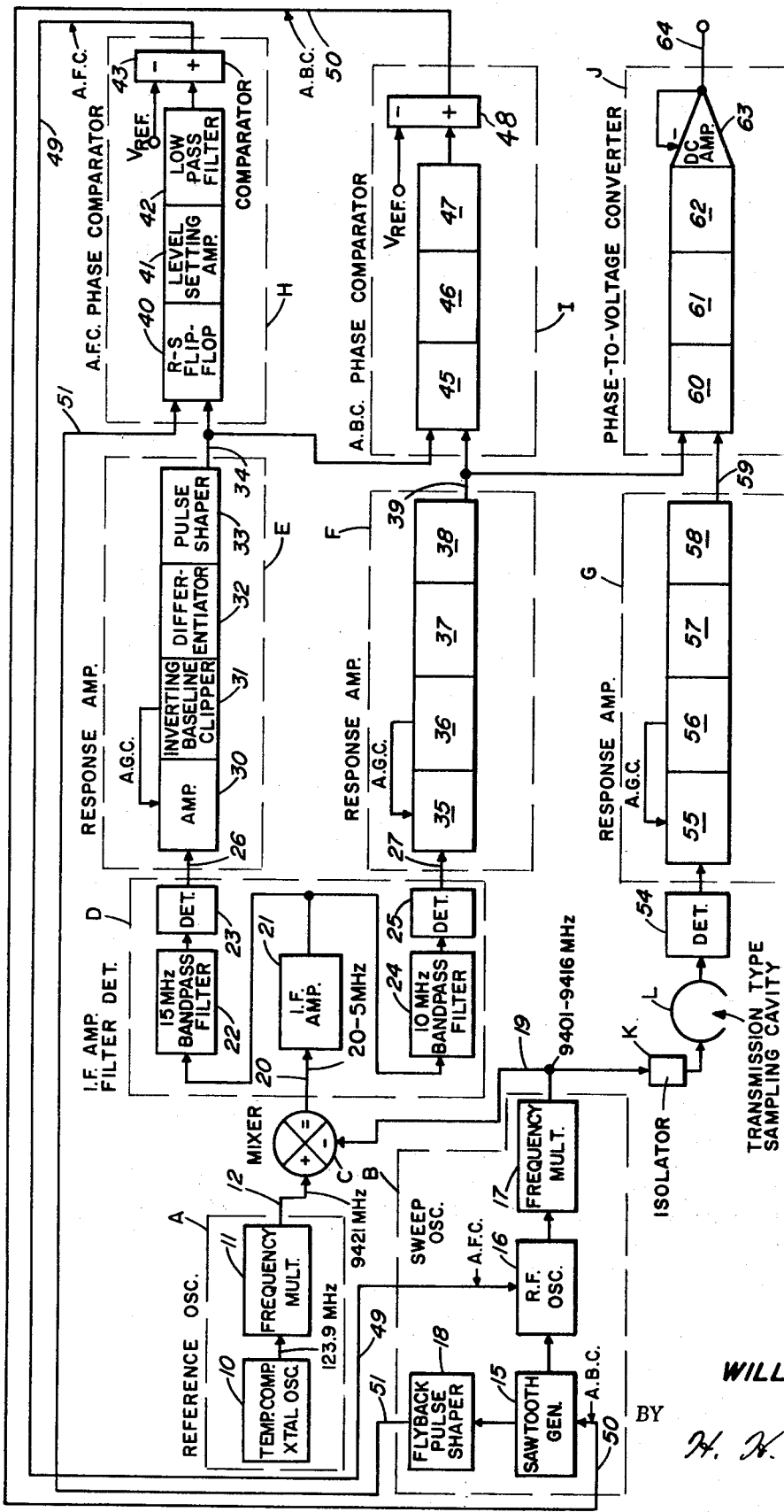
FIG. 1 is a block circuit schematic of the refractometer device.

Referring more particularly to FIG. 1, the refractometer device is shown in circuit schematic form with certain circuit blocks set off within dotted lines to provide functional circuit subassemblies (components). A reference oscillator designated within the dotted block A includes a temperature compensated crystal oscillator 10 coupled through a frequency multiplier circuit 11 to an output circuit 12. The temperature compensated crystal oscillator 10 generates, by way of example herein, 123.96 MegaHertz (MHz) in frequency which is multiplied by the frequency multiplier 11 to produce 9421 MHz.

A sweep oscillator component is shown in the dotted block B as having a sawtooth generator 15 coupled to frequency modulate a radio frequency (RF) generated in the RF oscillator 16. The output of the RF generator 16 is through a frequency multiplier circuit 17 to produce on its output 19 a range of frequencies from 9401 to 9416 MHz. The frequencies designated as being generated herein are solely for the purpose of example of providing a better understanding for the invention and are not in any way to be limited to these frequencies. The output 19 from the sweep oscillator (component B) and the reference frequency on the output 12 from the reference oscillator (component A) are mixed in a mixer circuit C to produce intermediate sweep frequencies of 20 MHz to 5 MHz.

The IF output from the mixer C is amplified in an IF amplifier 21 of an amplifier filter-detector circuit (component D), the output of which is in parallel to a 15 MHz band-pass filter 22 and detector 23 as well as to a 10 MHz band-pass filter 24 and detector 25. As the IF sweep from 20 MHz to 5 MHz is applied to the 15 MHz and 10 MHz channels, a frequency signal at 15 MHz will be detected on the output 26 and a 10 MHz frequency will be detected on the output 27 from the two channels.

The two outputs 26 and 27 from the IF amplifier filter-detector (component D) are applied, respectively, to two response amplifiers E and F. Each response amplifier E and F has an amplifier 30, an inverting base line clipper 31, a differentiator 32, and a pulse shaper 33 in circuit to the output 34, the corresponding elements in the lower channel being 35 through 39. The response amplifiers contain automatic gain control (AGC) circuits, as shown coupling each inverting base line clipper in negative feedback to the amplifier. The upper channel may be referred to as the AFC channel and the lower channel may be referred to as the ABC channel.

The output 34 from the upper channel response amplifier (component E) is coupled as an input to an AFC phase comparator circuit H consisting of a set-reset flip-flop circuit 40, a level setting amplifier 41, and a low pass filter 42 to a comparator 43. In like manner, the ABC channel has the series coupling 45 through 48, 48 being the comparator circuit for the ABC channel. Each comparator 43 and 48 has a voltage reference V applied thereto for comparison with the voltage out of the low pass filters 42 and 47, respectively. The output of the comparator 43 in the AFC channel is by way of conductor means 49 has a control input to the RF oscillator 16 in the sweep oscillator (component B) while the comparator 48 output from the ABC phase comparator (component I) is by way of the conductor means 50 to a control input of the sawtooth generator 15 in the sweep oscillator (component B). The AFC feedback 49 controls or stabilizes the frequency for the RF oscillator 16 while the ABC feedback 50 to the sawtooth generator 15 controls the bandwidth of the oscillations generated by the sweep oscillator (component B), as will later become clear in the description of operation. The flyback of the sawtooth generator 15 is coupled through a flyback shaper circuit 18 in the sweep oscillator (component B) and conducted by the way of the conductor means 51 as one input to the R-S flip-flop circuit 40 in the AFC phase comparator (component H) to set this circuit 40 in one of its two stable states, thereafter to be switched to its other stable state by the 15 MHz signal on the output 34. A branch conductor of the output 34 is also coupled as one input to the R-S flip-flop circuit 45 in the ABC phase comparator (component I) in like manner to set this circuit to one of its stable states, thereafter to be switched to its other stable state by the 10 MHz signal coming by way of the output conductor 39 coupled as the second input to the flip-flop circuit 45. The flyback voltage from the sawtooth generator 15 coming by way of the conductor 51 will flip the R-S flip-flop circuit 40 to one state and, while the sawtooth generator 15 is sweeping through its range, a signal will first be detected in the (component D) at 15 MHz and thereafter at 10 MHz to flip the R-S flip-flop circuit 40 to its other state and the flip-flop circuit 45 to its first state followed by the 10 MHz signal to flip 45 to its other bistable state. The sequence of this operation will become more clear in the description of operation with reference to FIG. 2.

The output 19 from the sweep oscillator (component B) is coupled to a transmission type sampling resonant cavity L through a ferrite isolator K which prevents any feedback from the sampling cavity L to the sweep oscillator (component B). If the RF frequency is swept from 9401 to 9416 MHz and is applied to the cavity L, it will cross through a resonant frequency due in part to the physical dimensions of the resonator cavity L which is open to the atmosphere for sampling the dielectric changes of the atmosphere. The high Q cavity L will resonate at only one frequency of the sweep frequency to produce an output which will be detected in a detector 54 coupled thereto. This detected output is coupled to a third response amplifier (component G) consisting of the same elements as in the prior first and second response amplifiers being the amplifier 55, an inverting base line clipper 56, a differentiator 57, and a pulse shaper 58 to produce an output 59. As in the prior response amplifiers, this response amplifier has AGC coupled from the clipper circuit 56 back to the amplifier 55. The resonant frequency detected in the cavity L will be reproduced on the output 59 as a sharp pulse which is applied to a phase-to-voltage converter (component J).

The phase-to-voltage converter (component J) includes an R-S flip-flop circuit 60, a level setting amplifier 61, and a low pass filter 62 in series in the same manner as found at the components H and I. In this converter (component J), J), however, the output of the low pass filter is coupled through a DC amplifier 63 to produce a DC voltage on its output 64 representative of the refractive index of the atmosphere to which the sampling cavity L is exposed.

OPERATION

Figure 2:
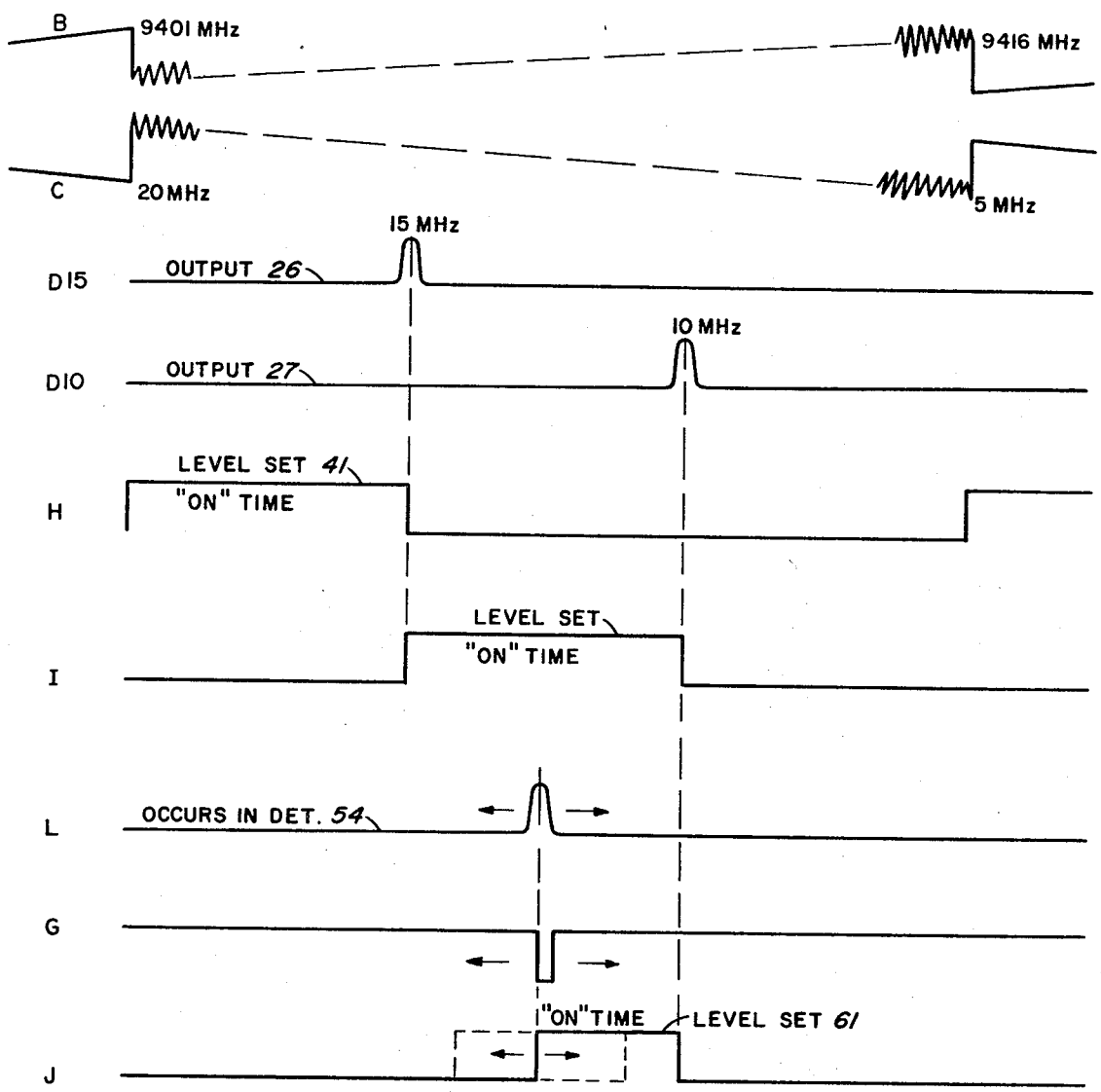
FIG. 2 is a set of waveforms showing the outputs at various points in FIG. 1.

In the operation of the microwave refractometer, with occasional reference to FIG. 2, let it be assumed that frequencies will be used for example, as indicated on FIG. 1. The reference oscillator A will produce a constant frequency of 9421 MHz which is applied to the mixer circuit C. The sweep oscillator (component B) will produce the range of frequencies from 9401 through 9416 MHz for every sweep of the sawtooth oscillator 15 on the output 19, applied also to the mixer C. The resultant output of the mixer will be in the form of subtracting the range of sweep frequencies on the output conductor 19 from the reference frequency on the output 12 to produce a sweep of IF frequency from 20 to 5 MHz with every sweep of the sawtooth generator 15. This intermediate frequency sweeping over the 15 and 10 MHz band-pass filters will first produce a detected output on 26 followed by an output on 27 indicative of the time periods that the sawtooth generator 15 starts and stops its sweep and also precise moments of the RF generated frequency in 16 modulated by this sweep voltage. This time period is established in the AFC channel by the time that the R-S flip-flop circuit 40 is in one of its states as compared with a reference voltage $V_{REF}$ applied to the comparator 43. The comparator 43 accordingly compares analog voltages to maintain a zero voltage output on the conductor 49. Any voltage on the output conductor 49, positive or negative, will be applied to the RF oscillator 16 to correct its oscillations which may be influenced to change by temperature or altitude changes surrounding the circuit. In like manner the detected 10 MHZ signal in the ABC channel will be amplified in the response amplifier (component F) and compared in the comparator 48 with a reference voltage depending on the time that the R-S flip-flop circuit 45 is placed in one of its conductive conditions from the output 34 applying the 15 MHz signal to the time of arrival of the 10 MHz signal on the output 39 to switch this multivibrator 45 a precise time interval from the 15 to 10 MHz signal time period to produce voltage, positive or negative, on the output 50 to control the sawtooth generator 15 in bandwidth. If the sawtooth generator 15 is influenced by either temperature or altitude to change its sweepwidth, the corrective voltage over conductor 50 will return the sawtooth generator to its proper sweepwidth. In this manner the sweep oscillator (component B) will produce a precise frequency range from 9401 to 9416 MHz for conduction to the resonant cavity L. With this precise frequency range a very accurate resonant point can be determined and detected to provide the output signal on the output 64 of the converter (component J) which analog voltage is calibrated accurately to represent the index of refraction of the atmosphere in the cavity. Where this equipment is used as airborne equipment, various compensating changes may be made in the radio transmitter and receiver equipment to correct for these atmospheric changes.

While it is to be understood that the microwave refractometer may be effectively utilized with other frequencies than as given as examples in FIG. 1, it is to be understood that I desire to be limited in the spirit of my invention only by the scope of the appended claims.

I claim:
1. An airborne microwave refractometer comprising:
   a sampling resonator having a cavity positioned in the atmosphere;
   a sweep frequency oscillator for generating radio frequencies over a range of frequency coupled to said sampling resonator to acquire resonance when a specific frequency in said range of frequencies resonate with said cavity to produce an output signal;
   a detector and converter means coupled to the output of said sampling resonator for detecting said resonance signal and converting same to a direct current voltage;
   a reference oscillator for generating a precise reference frequency;
   a mixer coupled to said reference oscillator and to said sweep frequency oscillator for mixing the oscillations to produce a range of intermediate frequencies on an output thereof;
   an intermediate frequency amplifier, filter means, and two detector circuit means coupled to said mixer output, the filter means having two band-pass filters of different intermediate frequencies providing two detected channel outputs; and
   an automatic frequency control phase comparator in one said channel and an automatic bandwidth control phase comparator in the other channel, the outputs of said frequency control and bandwidth control comparators being coupled to said sweep frequency oscillator to control the frequency and the bandwidth of the radio frequencies generated whereby the range of radio sweep frequencies are maintained accurate although temperature and altitude conditions change.

2. An airborne microwave refractometer as set forth in claim wherein:
   said sweep frequency oscillator includes a sawtooth generator and a radio frequency oscillator coupled together to produce a bandwidth of radio frequencies on the output thereof, the automatic frequency control output of said comparator being coupled to control the frequency of said radio frequency oscillator and the automatic bandwidth control output of said comparator being coupled to said sawtooth generator to control the bandwidth thereof.

3. An airborne microwave refractometer as set forth in claim 2 wherein:
   said two detected channel outputs include a response amplifier between each bandwidth filter and each comparator, each response amplifier consisting of an amplifier, an inverting base line clipper, a differentiator, and a pulse shaper with an automatic gain control feedback from said inverting base line clipper to said amplifier.

4. An airborne microwave refractometer as set forth in claim 3 wherein:

said automatic frequency control phase comparator and said automatic band-pass control phase comparator each includes a bistable multivibrator, a level setting amplifier, a low pass filter, and a comparator, in that order from input to output, the flyback signal from said sawtooth generator and the output signal from one of said response amplifiers constituting the inputs to said bistable multivibrator of said automatic frequency control phase comparator circuit, and the output of said one of said response amplifiers and from the other second response amplifier being the inputs to said bistable multivibrator in said automatic bandwidth control phase comparator circuit.

5. An airborne microwave refractometer as set forth in claim 4 wherein:

said detector and converter means coupled to the output of said sampling resonator includes a detector, a third response amplifier, and a phase-to-voltage converter, one input to said phase-to-voltage converter being the output of said second response amplifier and another input to said phase-to-voltage converter being from said third response amplifier whereby said cavity output signal is converted to a direct current voltage signal representative of the index of refraction of the atmosphere.

6. An airborne microwave refractometer as set forth in claim 5 wherein:

said reference oscillator is a temperature compensated crystal controlled oscillator of low frequency and a frequency multiplier to generate said precise reference frequency.